United States Patent [19]
Serot

[11] Patent Number: 5,435,336
[45] Date of Patent: Jul. 25, 1995

[54] CONTROLLED VALVE

[75] Inventor: Pierre Serot, Fontenay-aux-Roses, France

[73] Assignee: Legris S.A., Rennes, France

[21] Appl. No.: 74,487

[22] Filed: Jun. 11, 1993

[30] Foreign Application Priority Data

Jun. 12, 1992 [FR] France .................. 92 07096

[51] Int. Cl.⁶ .................. F16K 31/122; F16K 11/02
[52] U.S. Cl. .................. 137/219; 137/554; 137/625.26; 137/625.66; 251/63
[58] Field of Search .................. 137/219, 554, 625.26, 137/625.66; 251/31, 63

[56] References Cited

U.S. PATENT DOCUMENTS

| 746,337 | 12/1903 | Junggren | 251/31 X |
|---|---|---|---|
| 3,240,466 | 3/1966 | Meyer | 251/63 X |
| 3,706,322 | 12/1972 | Carlson | 137/625.66 |
| 4,173,327 | 11/1979 | Williams | 251/63 X |
| 4,340,086 | 7/1982 | Hemm et al. | 137/554 |

FOREIGN PATENT DOCUMENTS

| 0140432 | 5/1985 | European Pat. Off. . |
|---|---|---|
| 854873 | 4/1940 | France . |
| 1194431 | 11/1959 | France . |
| 2667376 | 4/1992 | France . |
| 1091824 | 10/1960 | Germany . |
| 7045539 | 4/1971 | Germany . |
| 338664 | 7/1959 | Switzerland . |

Primary Examiner—Gerald A. Michalsky
Attorney, Agent, or Firm—Griffin, Butler, Whisenhunt & Kurtossy

[57] ABSTRACT

A controlled valve comprising a substantially hollow and elongate body fitted at its longitudinal ends with means for coupling to a pipe that is to be closed, the body including a transverse partition with a central channel formed therethrough, and also including a closure element that is movable parallel to the fluid flow between a closed position in which a zone of said element is in contact with a stationary bearing surface formed on the transverse partition and an open position in which said zone is at a distance from said bearing surface, in which the closure element is in the form of a piston having two end heads slidably mounted in two respective chambers that are coaxial with the channel and that are situated inside the body on opposite sides of the transverse partition, and the sum of the projections in a transverse plane of the surface areas of the element exposed to the pressure that exists in the pipe upstream from the zone of contact between the closure element and the bearing surface and that face downstream is equal to the sum of the same projections of the surface areas that are similarly exposed to said pressure and that face upstream.

13 Claims, 3 Drawing Sheets

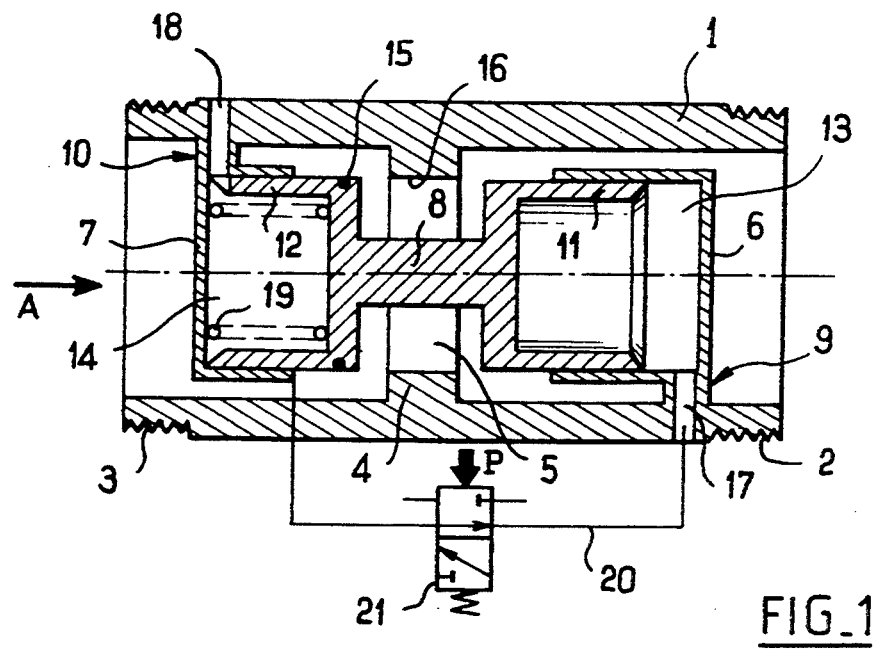
FIG_1
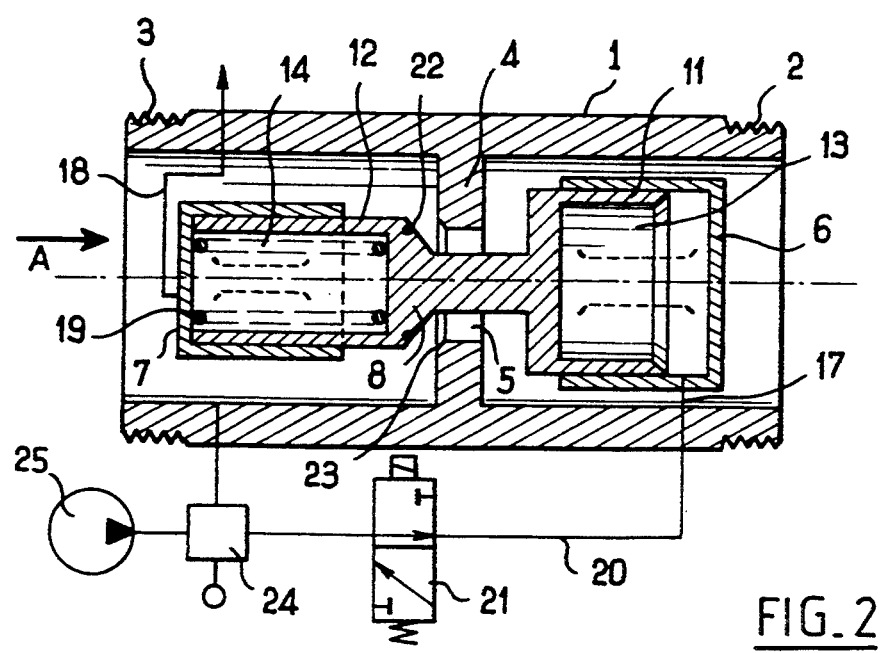
FIG_2

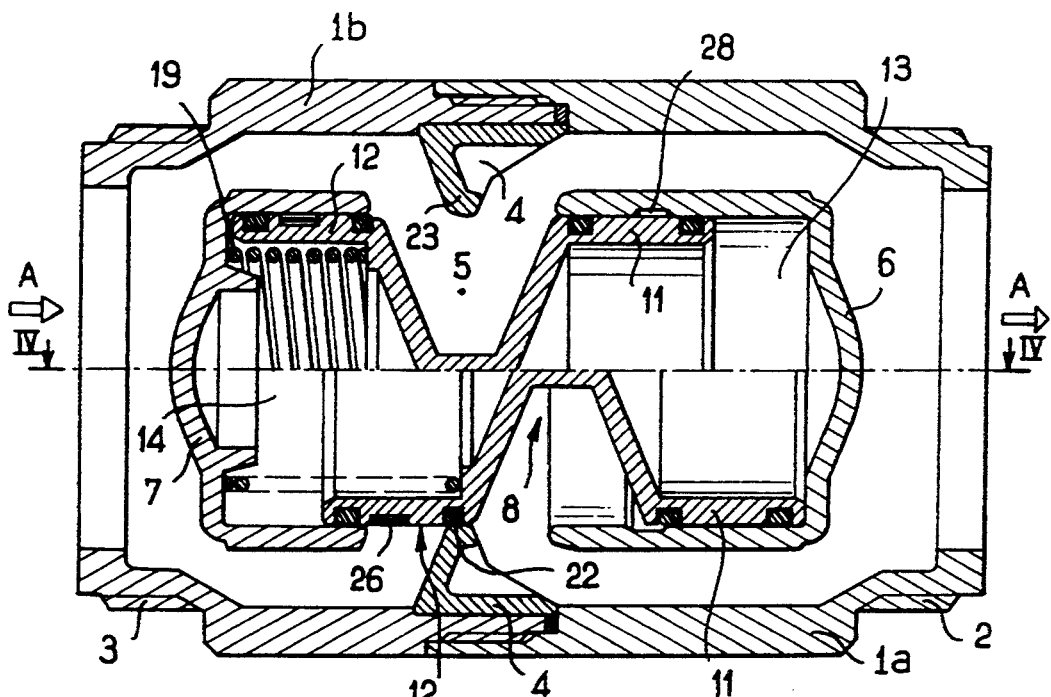
FIG 3
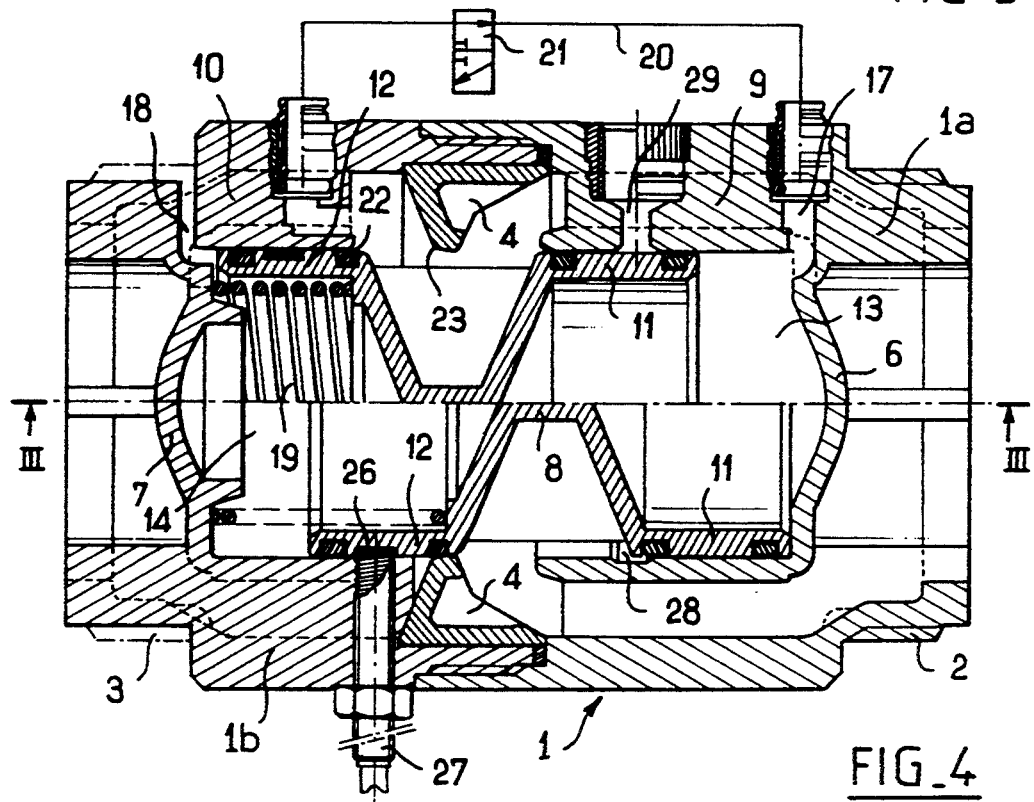
FIG_4

CONTROLLED VALVE

The present invention relates to a controlled valve that is intended particularly, but not exclusively, for use in a distribution network for a compressed fluid.

BACKGROUND OF THE INVENTION

Numerous devices are known for opening and closing a pipe remotely. Mention may be made, for example, of the device described in Document FR-A-2 667 376. The structure of such devices is relatively complex, and the principles on which they operate are not entirely satisfactory. For example, the open position of the valve is completely unstable, the slide being coupled to the stationary structure by resilient bellows which constitute a vibratory system in which vibrations are sustained by the fluid flow acting on a front surface of the closure piston. In addition, the force required for opening the valve is not zero, and it depends on the pressure of the fluid flowing in the pipe.

OBJECT AND SUMMARY OF THE INVENTION

To obtain an identical result, the invention proposes a valve architecture of simple structure in which the closure element is balanced with respect to the forces to which it is subjected, the energy required for causing said valve to change state being minimal.

More precisely, the present invention provides a controlled valve comprising a substantially hollow and elongate body fitted at its longitudinal ends with means for coupling to a pipe that is to be closed, the body including a transverse partition with a central channel formed therethrough, and also including a closure element that is movable parallel to the fluid flow between a closed position in which a zone of said element is in contact with a stationary bearing surface formed on the transverse partition and an open position in which said zone is at a distance from said bearing surface, wherein the closure element is in the form of a piston having two end heads slidably mounted in two respective chambers that are coaxial with the channel and that are situated inside the body on opposite sides of the transverse partition, and the sum of the projections in a transverse plane of the surface areas of the element exposed to the pressure that exists in the pipe upstream from the zone of contact between the closure element and the bearing surface and that face downstream is equal to the sum of the same projections of the surface areas that are similarly exposed to said pressure and that face upstream.

The closure element may be a slide or it may be a check element.

The sliding chambers are isolated from the channel inside the body and include means for acting on the piston heads during displacement of the element relative to the bearing surface.

In a variant that enables the pressure in the downstream portion of the closed pipe to be caused to drop, the body includes a purge orifice situated downstream from the zone of contact between the closure element and the bearing surface, which orifice is uncovered by the closure element while the closure element is in its channel opening state.

BRIEF DESCRIPTION OF THE DRAWINGS

Other characteristics and advantages of the invention appear from the description thereof given below with reference to the accompanying drawings, in which:

FIGS. 1 and 2 are two diagrammatic longitudinal sections through two variant embodiments of the invention;

FIGS. 3 and 4 are two orthogonal longitudinal sections through a first a practical embodiment of the FIG. 2 valve.

MORE DETAILED DESCRIPTION

Figure 5:
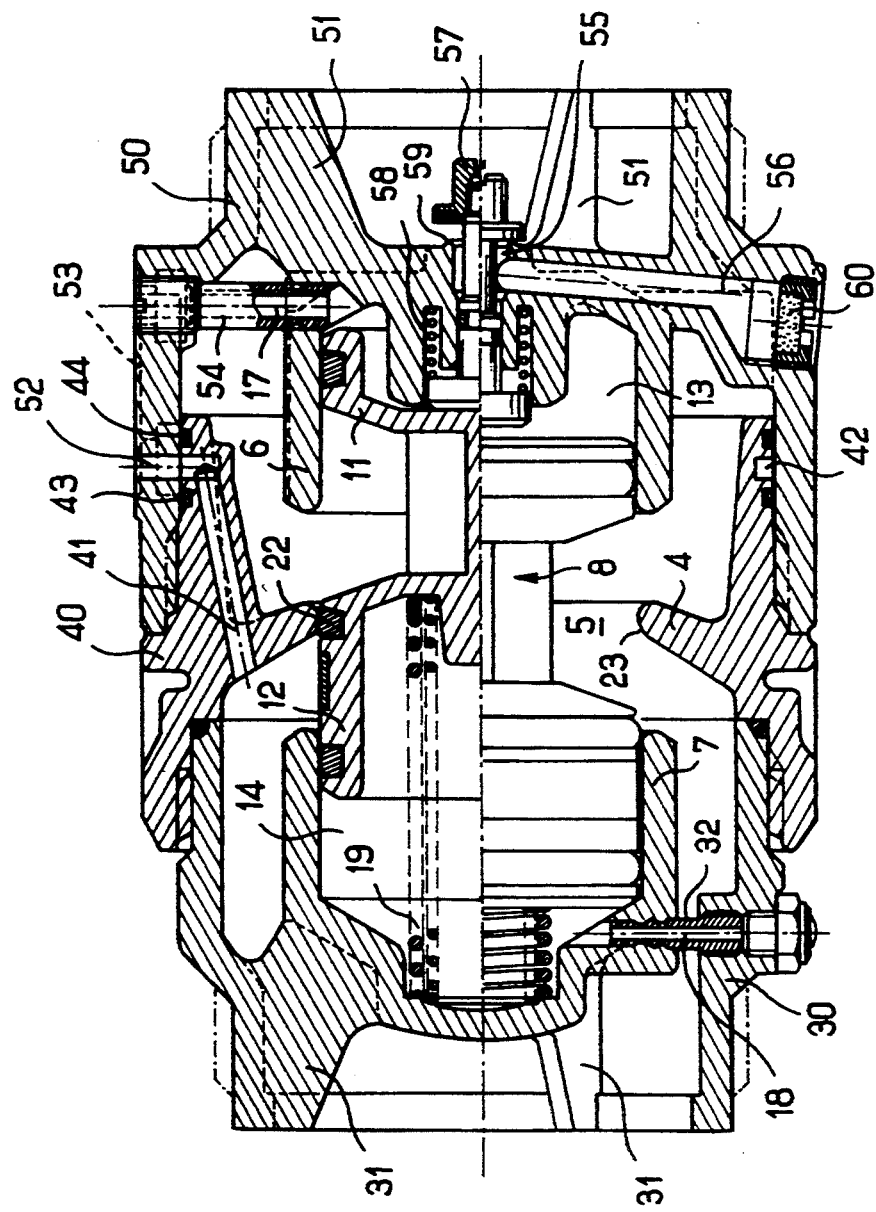
FIG. 5 is a longitudinal section view through a second practical embodiment of the valve of the invention.

FIG. 1 shows a valve of the invention comprising a cylindrical body 1 whose ends are fitted with means 2 and 3 enabling it to be connected to lengths of a pipe in which it is desirable to be able to be control opening and closing. The cylindrical body includes a transverse partition 4 having a cylindrical central channel 5 passing through it. On each side of the partition, the body 1 has a respective cylinder 6 or 7, which cylinders are open towards the partition and form sliding chambers for the ends of a closure element 8 that extends coaxially along the channel 5. The cylinders 6 and 7 are disposed on the axis of the body 1 and they are supported by radial fins such as the fins 9 and 10 visible in the figure. As a result of this disposition, fluid flowing in direction A follows a path of annular section through the body 1, firstly around the upstream cylinder 7, then around the element 8 inside the opening 5, and then around the downstream cylinder 6.

The ends of the element 8 are shaped as hollow piston heads 11 and 12 that form respective closed chambers 13 and 14 in the cylinders, which chambers are isolated from the annular section path along which the fluid flows. Piston head 12 includes a contact zone 15 (shown as a sealing ring) that can be brought into slide-like contact with the cylindrical edge 16 of the channel 5.

Thus, when the closure element 8 is pushed to the right in FIG. 1, piston head 12 completely closes the central channel 5, while piston head 11 comes to bear against the end of upstream cylinder 6. It may be observed that upstream from the contact zone 15 (sealing ring), between the head 12 and the bearing surface of cylindrical edge 16, the closure element 8 does not have any projecting surface, ie any surface of non-zero transverse projection. As a result (the closure element 8 being a slide), the force required for opening the channel 5 is independent of the pressure of the fluid upstream from the contact of piston head 12 and cylinder edge 16, and all that is required is that of merely overcoming the friction between these slide and the bearing surface.

The closure element 8 may be driven by selectively injecting a fluid under pressure into one or other of the chambers 13 and 14 while exhausting the other chamber via feed and exhaust ducts 17 and 18 extending along the radial fins 9 and 10. The closure element 8 may also be driven by a spring 19 in the chamber 14 urging it to the right in the absence of fluid under pressure in the chamber 13 and which is compressed if fluid under pressure is injected into the chamber 13. The duct 18 then merely constitutes a vent enabling the chamber 14 to "breathe".

It may be observed that the source of fluid under pressure may be constituted by the portion of the pipe situated upstream from the partition 4. Under such circumstances, the chamber 13 is connected by duct 17 and a duct 20 to said upstream portion. A controlling valve 21 enables the chamber 13 to be fed or exhausted. It can be manually controlled via a rotative control button or remotely controlled (electrically or pneumatically) via appropriate control means. Arrow P represents the piloting action of manual, electrical or pneumatic means on the controlling valve 21.

The controlled valve shown in FIG. 1 is a valve that is normally closed in the absence of pressure in the chamber 13. The effect of the spring 19 is to urge the contact zone 15 of the closure element 8 into the bearing surface of cylindrical edge 16. It may be advantageous, particularly from the safety point of view, to provide for the controlling valve 21 to be held in its position for exhausting the chamber 13 whenever there is a drop in pressure in the pipe upstream from the partition 4.

The embodiment shown in FIG. 2 differs from that described above by the fact that the closure element 8 is in the form of a conical check element 22 which is urged against a conical seat 23 formed around the channel 5 through the partition 4. The co-operating surfaces of the check element and of the seat are situated practically at the outer edge of the check element (see following figures) such that there is practically no surface on the piston head 12 for the pressure existing upstream from the partition 4 when the valve is closed to enable the pressure to apply a substantial axial force on the closure element 8. For example, if any surface area subject to the pressure of the fluid remains beyond the sealing ring 22 that forms the thrust surface between the check element and the seat, then the axial force that results therefrom on the closure element could be balanced by reducing the diameter of the sliding portion of the piston head in the cylinder 7.

It may also be observed that the downstream piston head 11 is larger in diameter than the upstream piston head 12 (unlike the previous figure where their diameters are equal). As a result the static and dynamic pressure of the fluid on the closure element has a component that accompanies the effect of the spring 19 and that encourages rapid closure in the event of the chamber 13 being exhausted.

Finally, the duct 20 feeding said chamber and including the controlling valve 21 itself comes from a selector valve 24 enabling pressure to be taken either from an external source 25 or else from the pressure that exists in the body of the controlled valve upstream from the seat 23.

FIG. 2 shows the controlling valve 21 as a monostable electrovalve so that the controlled valve according to the invention is closed when the electrovalve 21 is no longer supplied with pneumatic or electrical energy.

FIGS. 3 and 4 show a practical embodiment of the device shown in FIG. 2. FIG. 3 is a section view of FIG. 4 on line III—III thereof while FIG. 4 is a section view on line IV—IV of FIG. 3. These figures show some of the elements that have already been described and they are given the same references. The valve body 1 is made up of two portions 1a and 1b that are screwed together. This two-portion structure makes it possible to install the closure element 8 in the cylinders 6 and 7 (it may be observed that in the top half of each of the figures, the closure element is shown in its valve-open position and in the bottom half it is shown in its valve-closed position). Simultaneously, assembling the portions by screwing them together makes it possible to install the seat-forming middle partition 4 against which the sealing ring 22 of the element 8 comes to bear as a check element.

In addition to sealing rings for providing sliding sealing for the piston heads within the cylinders 6 and 7, the element 8 includes a groove 26 in piston head 12 which constitutes a marker suitable for being detected by a position sensor 27 for detecting the position of the closure element 8 relative to the seat 23. The sensor is carried by the body of piston head 12 and it extends along one of the radial fins that connect the cylinder 7 to the portion 1b of the body 1.

It may also be observed that the cylinder 6 possesses a groove 28 which is at least partially uncovered by the piston head 11 when the closure element 8 is in its closed position. A purge duct 29 opens out into this groove and passes along the radial fin 9 connecting the cylinder 6 to the portion 1b of the body 1. This duct therefore communicates with a portion of the path inside of the valve that is situated downstream from the seat 23 when it is isolated from the upstream portion and it connects said portion with the outside atmosphere if the fluid is air, or with a fluid-recovery tank if the fluid is a liquid or some other gas. This constitutes a considerable safety measure since it makes it possible to purge equipment that may be blocked at the moment of cut-off, e.g. in a part-clamping position.

In FIG. 5, unlike FIGS. 3 and 4, the open position of the controlled valve is shown in the lower portion of the figure while its closed position is shown in the upper portion. Elements shown in this figure and already described are given the same references as in the preceding figures.

In this case, the valve body comprises three coaxial portions 30, 40, and 50. The portion 30 has three fins 31 carrying the cylinder 7 in which the piston head 12 of the closure element 8 slides.

The duct 18 is implemented by a tubular metal insert 32 installed between two of the fins 31. It has been observed that incorporating the duct directly in a fin requires the fin in question to be thicker than the others and if manufacture is by molding a thermoplastic material, this gives rise to unbalance during cooling (giving non-uniform shrinkage), thereby moving the cylinder 7 off the axis.

The first portion 30 of the valve body has the second portion 40 screwed thereto, which second portion forms the partition 4 and carries the seat 23 against which the sealing ring 22 carried by piston head 12 comes to bear. Once screwed together, the portions may be locked together by any appropriate means (gluing, welding, . . . ). The portion 40 includes an inside pipe 41 which constitutes a length of the duct 20 (see FIG. 4) for controlling the valve by means of the pressure that exists upstream from the seat 23. This inside pipe 41 opens out into an outside groove 42 formed in an outside cylindrical surface of the portion 40 and disposed between two sealing rings 43 and 44.

The third portion 50 is likewise screwed onto the second portion 40 of the valve body, thereby overlying the groove 42. This portion has three fins 51 carrying the cylinder 6 in which the piston head 11 of the closure element 8 slides. Facing the groove 42, the portion 50 includes a hole 52 which opens to the outside of the body of the controlled valve via a surface 53 for receiving the controlling valve 21 (see FIG. 4). A tubular insert 54 which constitutes the duct 17 for feeding control fluid to the chamber 13 connects said surface 53 to the chamber 13.

In this embodiment, the downstream portion of the pipe as closed by the controlled valve can be exhausted via a duct 55, 56 formed in the end wall of the cylinder 6, said exhaust duct including a closing check valve 57 urged against its seat 59 by a spring 58 and having a rod that projects into the chamber 13. Thus, when the valve is closed, the head 11 of the piston pushes the rod of the check valve 57 so as to open the exhaust duct 55, 56. The spring 58 is rated so as to be able to overcome the effect of the pressure that exists inside the chamber 13.

Finally, in FIG. 5, it may be observed firstly that an exhaust silencer 60 is located at the end of the duct 56 (which may be replaced by a plug if the fluid is a liquid), and secondly that the spring 19 is constituted by a pair of springs so as to obtain a thrust force on the closure element that is non-linear and that is greater at the beginning of the stroke.

I claim:

1. A controlled shutoff valve comprising a substantially hollow and elongate body fitted at longitudinal ends thereof with means for coupling the body to a pipe that is to be closed and a transverse partition with a central channel formed therethrough, and a closure element that is movable in a direction parallel to a fluid flow in the body, between a closed position in which a zone of said closure element is in contact with a stationary bearing surface formed on the transverse partition and an open position in which said zone is at a distance from said bearing surface, the closure element being in the form of a piston having two end heads slidably mounted in two respective cylinders that are coaxial with the channel and disposed inside the body on opposite slides of the transverse partition, wherein when coupled to said pipe, said body is coaxial with the pipe and defines a linear flow path through said body including said channel and annular sections between said cylinders and said body, said closure element having, between one of said heads located upstream in the fluid flow and said zone, an external surface having areas facing upstream and areas facing downstream, and wherein a sum of projections in a transverse plane of said areas facing downstream is equal to a sum of projections in said plane of said areas facing upstream.

2. A valve according to claim 1, wherein the contact bearing surface of the closure element is conical.

3. A valve according to claim 1, wherein the sliding chambers are isolated from the channel inside the body and include means for acting on the piston heads during displacement of the element relative to the bearing surface.

4. A valve according to claim 3, wherein said means comprise a return spring compressed between a piston head situated upstream from the bearing surface and the axial end of the corresponding chamber.

5. A valve according to claim 4, including controlling means for selectively putting the second chamber situated downstream from the bearing surface into communication with the portion of the pipe that is situated upstream from the bearing surface and into communication with an exhaust orifice.

6. A valve according to claim 5, wherein the diameter of the downstream piston head of the closure element is not less than the diameter of the upstream piston head.

7. A valve according to claim 3, wherein the body includes an exhaust orifice for the downstream portion of the closed pipe situated downstream from the contact zone between the closure element and the bearing surface, as uncovered by the closure element when in its position closing the central channel.

8. A valve according to claim 1, wherein the body comprises two portions that are assembled together by being screwed together substantially level with the transverse partition.

9. A valve according to claim 1, wherein the closed position of the closure element is defined by an abutment which is stationary relative to the valve body.

10. A valve according to claim 1, including a position detector for detecting the position of the closure element.

11. A valve according to claim 1, wherein the contact bearing surface of the closure element is cylindrical.

12. A valve according to claim 1, wherein the body includes an exhaust pipe situated downstream from the contact zone between the closure element and the bearing surface, which exhaust pipe is normally closed by a check valve that is opened by the closure element when in its position closing the central channel.

13. A valve according to claim 1, wherein the body comprises three portions that are screwed together, which portions include a central portion carrying the partition and end portions carrying the cylinders.

* * * * *